3,287,285
CHAIN EXTENDED STANNOSILOXANES AND METHOD

Stuart B. Eglin, Los Angeles, and Abraham L. Landis, Northridge, Calif., assignors to Hughes Aircraft Company, a corporation of Delaware
No Drawing. Filed Oct. 17, 1963, Ser. No. 317,032
4 Claims. (Cl. 260—2)

This invention relates to a method for the production of elastomeric gums by chain extension of silanol terminated random polystannosiloxanes, and the product produced by the method.

Prior art polystannosiloxanes, possess relatively low molecular weights which lack shear strength, stability to air, moisture and elevated temperatures.

The elastomers produced by the method of this invention are produced by chain extension of silanol terminated random polystannosiloxanes. Where the repeating units in the polymer chains are dialkylstanno groups, having one to four carbon atoms per alkyl side group, and diorganosiloxy groups having any of methyl, phenyl, vinyl or allyl groups as side groups, hereinafter referred to in this description as silanol terminated polystannosiloxanes, the products obtained by the application of this method are referred to hereinafter in this description as chain-extended polystannosiloxanes.

Accordingly, it is an important object of this invention to provide a method for producing chain extended polystannosiloxanes of increased molecular weight and improved properties.

Stated in general terms the objects of this invention are attained by preparing silanol terminated polystannosiloxanes having number average molecular weights of not less than 1500, and treating the products with a diorganodichlorosilane and a tertiary amine in equimolar amounts. The resulting reaction mixture is processed for the removal of tertiary amine hydrochlorides, and unreacted volatile material from the polymeric product. The polymeric product is exposed to the atmosphere to produce elastomeric gums having improved properties over prior art stannosiloxanes. The improved stannosiloxane elastomeric gums can be cured by means conventionally employed for the production of silicone rubbers.

Only silanol terminated stannosiloxane polymers having high molecular weights can be successfully chain extended. Such products are very high in bulk viscosity, having pour points well above 25° C. Polymers of such high viscosity can be prepared only by means of a very rapid interfacial cohydrolysis reaction procedure. The use of this polymerization technique is an integral part of the subject process for the preparation of stannosiloxane elastomers.

The organometallic compounds that are useful as starting materials for the preparation of silanol terminated stannosiloxanes are among the group of organosilicon and organotin compounds that contain two or more chlorine atoms and not more than one phenyl group, or no phenyl group, per molecule. More specifically, the organosilicon and organotin compounds that are of importance for the preparation of silanol terminated stannosiloxanes on the basis of availability or properties are listed below and all references to organosilicon or organotin compounds hereinafter in this description are intended to include but not be limited to the compounds listed:

Dimethyldichlorosilane
Methylphenyldichlorosilane
Methylvinyldichlorosilane
Methylallyldichlorosilane
Phenylvinyldichlorosilane
Phenylallyldichlorosilane
Phenyltrichlorosilane
Methyltrichlorosilane
Dimethyltin dichloride
Diethyltin dichloride
Dipropyltin dichloride
Dibutyltin dichloride Organosilicon and organotin compounds have been employed in mixtures at appropriate molar ratios to yield high molecular weight silanol terminated stannosiloxane polymers having Si:Sn atomic ratios of 3:1 or higher.

In the interfacial cohydrolysis procedure, a solution of a mixture of organosilicon and organotin compounds in an appropriate organic solvent and an aqueous solution of an inorganic base as an alkali hydroxide and a soluble detergent are dispersed in a blender at a high rate of shear for about two minutes and the polymer subsequently recovered from the organic solvent. The reaction conditions employed have been determined experimentally as optimal for the formation of high molecular weight product. By means of chemical and spectrographic analyses, the products have been determined to be essentially linear silanol terminated stannosiloxane polymers. Although the formation of some cyclic stannosiloxane molecules is theoretically possible in cohydrolysis reactions of the kind described in general terms above, the presence of any cyclic stannosiloxane in the cohydrolysis reaction products obtained by the procedure described does not limit the applicability of the method described hereinafter for the preparation of chain extended stannosiloxanes or stannosiloxane elastomers.

The method employed for the preparation of chain extended stannosiloxanes having the properties of elastomeric gums consists of treating silanol terminated stannosiloxanes in bulk or in a non-polar solvent with equimolar amounts of a diorganodichlorosilane and a tertiary amine followed by the removal of amine hydrochloride, unreacted material and solvent from the product, and exposing the product to the atmosphere for several hours with occasional stirring. The products are viscous fluids which progressively increase in bulk viscosity to become strong elastomeric gums after several hours exposure to the atmosphere.

It is postulated that a condensation reaction occurs between dimethyldichlorosilane and silanol terminated stannosiloxane molecules in the presence of a tertiary amine acid acceptor to yield chloro terminated stannosiloxanes and amine hydrochlorides. It is further postulated that chloro terminated stannosiloxanes undergo hydrolytic condensation on exposure to atmospheric moisture and also that condensation occurs between chloro terminated molecules and silanol terminated molecules, resulting in increased polymer chain length and, therefore, in improved properties.

Detailed examples illustrating specific embodiments of the invention are given below:

Example 1

An aqueous solution consisting of potassium hydroxide (160 g., 2.86 moles) and a quaternary ammonium derivative, known to the trade as Arquad T-50 (tallow trimethyl ammonium chloride), (1.0 g.) in 650 ml. of water cooled to −10° C. was placed in a large ice-jacketed laboratory blender. An organic phase consisting of methylphenyldichlorosilane (172 g., 0.9 mole), methylvinyldichlorosilane (10.0 g., 0.05 mole), dimethyltin dichloride (22 g., 0.10 mole) and dibutyltin dichloride (45 g., 0.15 mole) in 700 ml. of toluene cooled to −10° C., was added rapidly to the aqueous phase while the blender was operating at high speed. The mixture was dispersed at high speed for three minutes and the organic layer decanted. Removal of solvents from the organic phase under reduced pressure at room temperature resulted in virtually quantitative yield of a clear dilatant product.

To approximately 50 grams of the polymer were added 10 ml. of dimethyldichlorosilane. Then 10 ml. of pyridine was added in an exothermic reaction. The resulting pyridine dihydrochloride was separated by the addition of 10 ml. of hexane and centrifuging the resulting viscous solution. The polymer solution was concentrated by removal of hexane under reduced pressure, and a sharp increase in viscosity was observed. The recovered polymer was gummy and elastic, but would flow slightly at room temperature. After exposure to the atmosphere for about a half hour with occasional stirring, the fluid polymer congealed to a tough elastic gum. The product was benzene soluble but exhibited no measurable effect on the freezing point of the solvent.

A quantity (5.0 g.) of the chain extended stannosiloxane polymer prepared as described above was well mixed on a glass plate with a small amount (0.1 g.) of a 50 percent suspension of dibenzoyl peroxide in a silicone polymer base, known to the trade as Luperco-AGE. The pliable polymer-peroxide composition was wrapped tightly in aluminum foil and heated in an oven at 250° F. for thirty minutes, during which time an apparently complete cure was effected. The cured sample had no surface tackiness and exhibited recovery on deformation and could not be torn or crumbled with finger pressure.

*Example 2*

Dimethyltin dichloride (55 g., 0.25 mole) was dissolved in 250 ml. of dried, distilled methylene chloride and centrifuged. The clear solution was decanted and 75 ml. of methylene chloride, 325 ml. of alcohol-free chloroform, dichlorodimethylsilane (65 g., 0.5 mole), methylphenyldichlorosilane (95 g., 0.5 mole), phenylvinyldichlorosilane (10 g., 0.05 mole), and dimethyltin dichloride (55 g., 0.25 mole) were added. A solution of potassium hydroxide (151 g., 2.7 moles) and a quaternary ammonium derivative known to the trade as Arquad T-50 (4.0 g.) in 650 ml. of distilled water was cooled to 0° C. and placed in a large (5-quart) ice-jacketed laboratory blender. The methylene chloride solution, cooled to 5° C., was then rapidly added with stirring at moderate speed. Stirring was continued at high speed for three minutes. The emulsion was then decanted. The organic layer was separated and centrifuged to remove suspended water. Upon removal of solvent, under reduced pressure, a clear tacky gum was obtained in 90 percent yield (135 g., theory 147 g.). The molecular weight, as determined cryoscopically in benzene, was 2360.

To 50 gms. of the polymer were added a solution of 30 ml. of dimethyldichlorosilane and 30 ml. of pyridine in 100 ml. of benzene. An exothermic reaction took place. The volatile components of the reaction mixture were then removed at reduced pressure without external heat. Then 100 ml. of hexane was added. The pyridine dihydrochloride was removed by centrifugation. The excess hexane was removed under reduced pressure. Then the residue, which was a relatively clear liquid, lower in bulk viscosity than the starting polymer, was exposed in a shallow dish to the atmosphere. The bulk viscosity of the polymer increased progressively over a period of about three hours, yielding a tough elastomeric gum. The resulting gum was slowly soluble in benzene but exhibited no measurable effect on the freezing point of the solvent.

Ten grams of the product were tested for curability in a manner identical with that described in Example 1, with the same results.

*Example 3*

(a) Dimethyldichlorosilane (19.4 g., 0.15 mole), phenyltrichlorosilane (4.2 g., 0.02 mole), methylvinyldichlorosilane (1.4 g., 0.01 mole) were dissolved in 150 ml. of alcohol-free chloroform and dibutyltin dichloride (21.3 g., 0.07 mole) was added and dissolved. A solution of potassium hydroxide (22.8 g., 0.4 mole), a quaternary ammonium derivative known to the trade as Arquad T-50, potassium carbonate (17.5 g. 0.125 mole) and (1 g.) was cooled to $-10°$ C. and placed in the ice-jacketed blender. The chloroform solution was cooled to $-20°$ C., then was added rapidly with stirring at moderate speed. The resulting emulsion was stirred then at a high speed for four minutes and the organic phase separated by centrifugation. On removal of chloroform under reduced pressure, a white rubbery solid (25.3 g., 31.9 g. theory) was recovered, which was soluble in common solvents, melted from 140–145° C. and had a molecular weight, determined cryoscopically in benzene, of 2200.

*Analysis.*—Found: Percent carbon 37.62, percent hydrogen 7.21. Calc.: Percent carbon 37.93, percent hydrogen 7.16.

(b) An aqueous soltuion consisting of potassium hydroxide, a quaternary ammonium derivative known to the trade as Arquad T-50 (160 g., 2.86 moles) and (1 g.) in 650 ml. of water was cooled to $-10°$ C. and placed in a large ice-jacketed laboratory blender. An organic phase consisting of dimethyldichlorosilane (123 g., 0.95 mole), phenylvinyldichlorosilane (10 g., 0.05 mole) and dimethyltin dichloride (44 g., 0.20 mole) dissolved in 800 ml. of toluene and cooled to 0° C., was rapidly added to the aqueous phase and stirred at high speed for three minutes. The organic phase was separated and the solvent removed under reduced pressure. A clear dilatant gum having a molecular weight of 1800, determined cryoscopically in benzene, was obtained in essentially quantitative yield.

(c) A solution of potassium hydroxide (160 g., 2.86 mole), a quaternary ammonium derivative known to the trade as Arquad T-50, and (2 g.) in 600 ml. of water initially at $-5°$ C. and a solution of dimethyldichlorosilane (104 g., 0.80 mole), of phenylvinyldichlorosilane (20 g., 0.10 mole) and dimethyltin dichloride (44 g., 0.20 mole) in 650 ml. of toluene initially at 12° C. were added simultaneously into an ice-jacketed laboratory blender operating at moderate speed. The mixture was blended at high speed for two minutes and centrifuged. Removal of the solvent under reduced pressure yielded a clear dilatant product having a molecular weight of 2100 as determined cryoscopically in benzene Fifty grams of polymer, pooled from paragraphs (a), (b) and (c) were treated in a manner identical to that described in Example 2 above. A tough elastomeric gum was obtained which slowly dissolved in benzene, but exhibited no measurable effect on the freezing point of the solvent.

Obviously many other modifications and variations of the present invention are possible in the light of the above teachings. It is therefore to be understood that within the scope of the appended claims the invention can be practiced otherwise than as specifically described.

What is claimed is:

1. A method for the production of a chain extended essentially linear silanol terminated stannosiloxane elastomer polymer having an average molecular weight of not less than 1500 and with repeating units in the polymer chain being selected from the groups consisting of dialkylstanno group, having one to four carbon atoms in the alkyl group, and diorganosiloxy group selected from the group consisting of an alkyl group of one to four carbon atoms, phenyl, vinyl, allyl, and mixtures of the same, which comprises the steps of: reacting (1) a diorganodichlorosilane wherein the organic radical is selected from the group consisting of alkyl group of one to four carbon atoms, vinyl, allyl, phenyl and mixtures of the same, and (2) a dialkyltin dichloride wherein the alkyl radical contains one to four carbon atoms; said reaction being accomplished with water by interfacial cohydrolysis in the presence of alkali hydroxide and a soluble detergent to produce a silanol terminated stannosiloxane polymer; reacting said polymer with (3) a diorganodichlorosilane wherein the organo portion is selected from the group consisting of an alkyl of one to four carbon atoms, phenyl, vinyl, allyl, and mixtures of the same, in the presence of a tertiary amine, hydrolytically condensating the reaction product of (1), (2) and (3), aging the said product in a moist atmosphere, and obtaining a said stannosiloxane polymer.

2. The method according to claim 1 wherein a reaction product of (1) and (2) is reacted with dimethyldichlorosilane in the presence of pyridine to produce a chloro terminated stannosiloxane polymer.

3. An elastomer produced according to the method of claim 1.

4. An elastomer produced according to the method of claim 2.

References Cited by the Examiner

UNITED STATES PATENTS 2,998,407   8/1961   Foster et al. _____ 260—2

SAMUEL H. BLECH, *Primary Examiner.*